United States Patent
Seki et al.

(10) Patent No.: US 8,169,747 B2
(45) Date of Patent: May 1, 2012

(54) CUSHIONING RAMP HAVING A STEPPED STRUCTURE FOR A MAGNETIC DISC APPARATUS

(75) Inventors: Shota Seki, Fujisawa (JP); Shuichi Kiyomoto, Fujisawa (JP); Nobuyuki Oka, Fujisawa (JP); Michiya Totoki, Fujisawa (JP); Teruhiro Nakamiya, Yokohama (JP); Takeji Sumiya, Fujisawa (JP); Tomoki Hiramatsu, Fujisawa (JP); Kohji Takahashi, Yamato (JP)

(73) Assignees: Nippon Mektron, Ltd. (JP); Hitachi Global Storage Technologies Netherlands B.V. (JP)

( * ) Notice: Subject to any disclaimer, the term of this patent is extended or adjusted under 35 U.S.C. 154(b) by 317 days.

(21) Appl. No.: 12/547,027

(22) Filed: Aug. 25, 2009

(65) Prior Publication Data

US 2010/0061012 A1 Mar. 11, 2010

(30) Foreign Application Priority Data

Sep. 10, 2008 (JP) ................. 2008-231788

(51) Int. Cl.
*G11B 5/54* (2006.01)
(52) U.S. Cl. .................................... 360/254.8
(58) Field of Classification Search ............... 360/254.8
See application file for complete search history.

(56) References Cited

U.S. PATENT DOCUMENTS

| | | | | |
|---|---|---|---|---|
| 4,837,651 A * | 6/1989 | Tanaka et al. | ............... | 360/133 |
| 4,863,031 A * | 9/1989 | Tanaka et al. | ............... | 720/727 |
| 6,055,134 A * | 4/2000 | Boutaghou | ............... | 360/254.4 |
| 6,115,214 A * | 9/2000 | Allsup et al. | ............... | 360/254.3 |
| 6,122,130 A * | 9/2000 | Boutaghou et al. | ............ | 360/75 |
| 6,271,987 B1 * | 8/2001 | Allsup et al. | ............... | 360/97.03 |
| 6,275,356 B1 * | 8/2001 | Boutaghou et al. | ....... | 360/254.8 |
| 6,278,584 B1 * | 8/2001 | Zhang et al. | ............... | 360/254.8 |
| 6,292,333 B1 * | 9/2001 | Blumentritt et al. | ....... | 360/254.8 |
| 6,437,945 B1 * | 8/2002 | Hawwa et al. | ............ | 360/254.8 |
| 6,765,762 B2 * | 7/2004 | Yanagihara | ............... | 360/254.8 |
| 7,768,745 B2 * | 8/2010 | Okada et al. | ............... | 360/254.8 |
| 2001/0033460 A1 * | 10/2001 | Fayeulle et al. | ............ | 360/254.8 |
| 2002/0131212 A1 * | 9/2002 | Yanagihara-shi | .......... | 360/254.8 |
| 2005/0018354 A1 * | 1/2005 | Takahashi | .................. | 360/254.8 |
| 2006/0262448 A1 * | 11/2006 | Okada et al. | .................... | 360/69 |

FOREIGN PATENT DOCUMENTS

| | | |
|---|---|---|
| JP | 2002-279744 | 9/2002 |
| JP | 2002-367314 | 12/2002 |
| JP | 2005-310333 | 11/2005 |
| JP | 2006-323939 | 11/2006 |
| JP | 2007-280517 | 10/2007 |

* cited by examiner

*Primary Examiner* — David D Davis
(74) *Attorney, Agent, or Firm* — Harness, Dickey & Pierce, P.L.C.

(57) ABSTRACT

For cushioning a shock to prevent problems such as a reading error, a ramp for a magnetic disc apparatus is made of a resin material for forming a ramp main body and a material having higher rigidity than the resin material, disc facing surfaces in the disc insertion portion for inserting a magnetic disc is provided with disc contact portions made of the high rigidity material, a bottom surface portion of a concave portion of the disc insertion portion is constructed by a combination of a bottom surface portion made of the resin material and a bottom surface portion made of the high rigidity material, and a step structure is provided by arranging the bottom surface portion made of the high rigidity material at a position moved rearward in a depth direction of the concave portion in comparison with the bottom surface portion made of the resin material.

2 Claims, 6 Drawing Sheets

EMBODIMENT

COMPARATIVE EXAMPLE

FIG. 2(B)

EMBODIMENT

FIG. 3(A)

COMPARATIVE EXAMPLE

FIG. 3(B)

EMBODIMENT

CUSHIONING RAMP HAVING A STEPPED STRUCTURE FOR A MAGNETIC DISC APPARATUS

BACKGROUND OF THE INVENTION

1. Field of the Invention

The present invention relates to a ramp used for a load/unload mechanism in a magnetic disc apparatus such as a hard disc drive (HDD) or the like, and more particularly to a ramp formed as a 2-color molded product made of a resin material forming a ramp main body and a material having a higher rigidity than the resin material.

2. Description of the Conventional Art

Figure 5A:
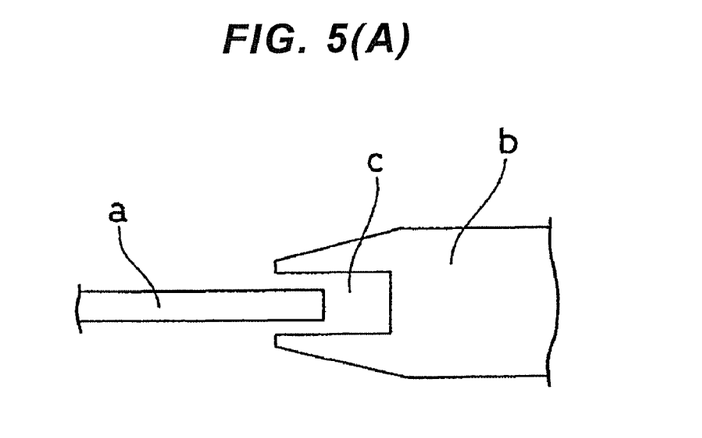
FIGS. 5A, 5B and 5C are explanatory views of a ramp in accordance with a conventional art.
Figure 5B:
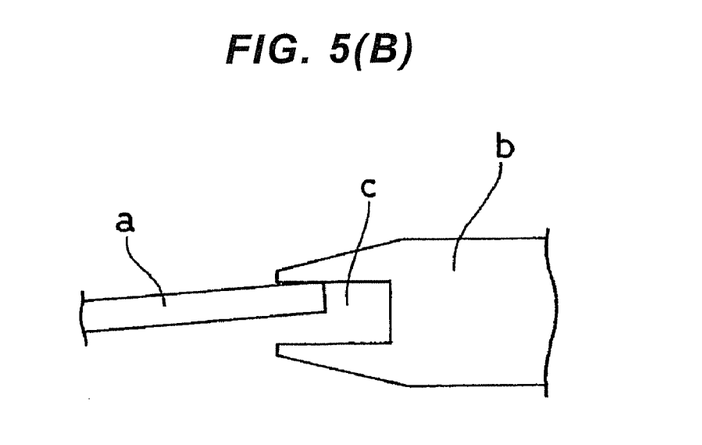
Figure 5C:
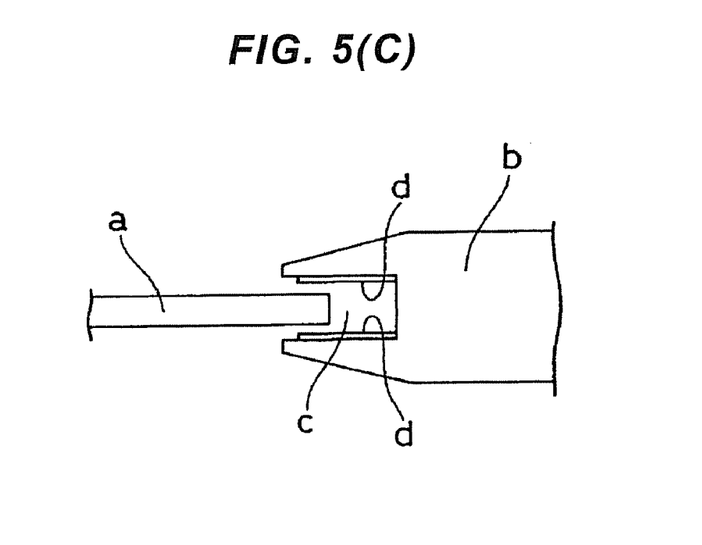

In recent years, an HDD is introduced to mobile consumer electronics such as a music player, a digital video camera and the like, in addition to a personal computer, and a shock resistant specification is becoming severe. Under such circumstances, as shown in FIGS. 5A to 5B, there arises a phenomenon that a disc a in an inner portion of a case deflects at a time when the HDD is exposed to a shock, whereby the disc a made of a glass or an aluminum and having a high strength comes into contact with a ramp b formed by a resin (POM, LCP or the like) having a good sliding characteristic, and the ramp b is greatly worn away. In this case, since a scattering of a lot of abrasion powder causes a reading and writing error of a head, it is necessary to apply a countermeasure. Accordingly, in order to reduce the abrasion powder, there is employed a countermeasure of forming disc facing surfaces in inner surfaces of a concave disc insertion portion c in the ramp b by a resin (PEI, PI or the like) d having a high rigidity, that is, forming the ramp b as a 2-color molded product made of a resin having a good sliding characteristic and a resin having a high rigidity, as shown in FIG. 5C. In accordance with this countermeasure, it is possible to form the ramp having a reduced abrasion powder caused by a contact between the disc a and the ramp b, and having a high sliding characteristic.

Figure 6A:
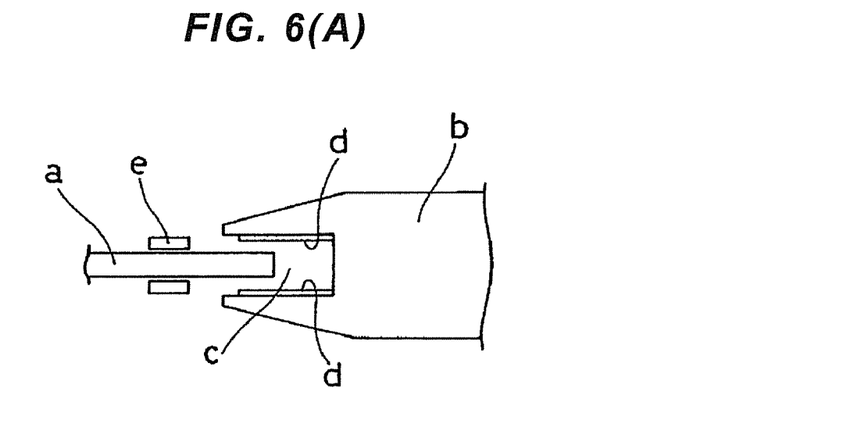
FIGS. 6A, 6B and 6C are explanatory views of a ramp in accordance with a conventional art.
Figure 6B:
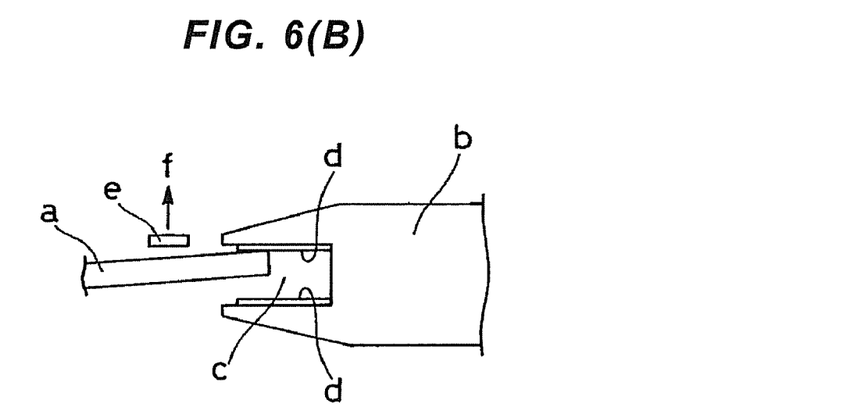
Figure 6C:
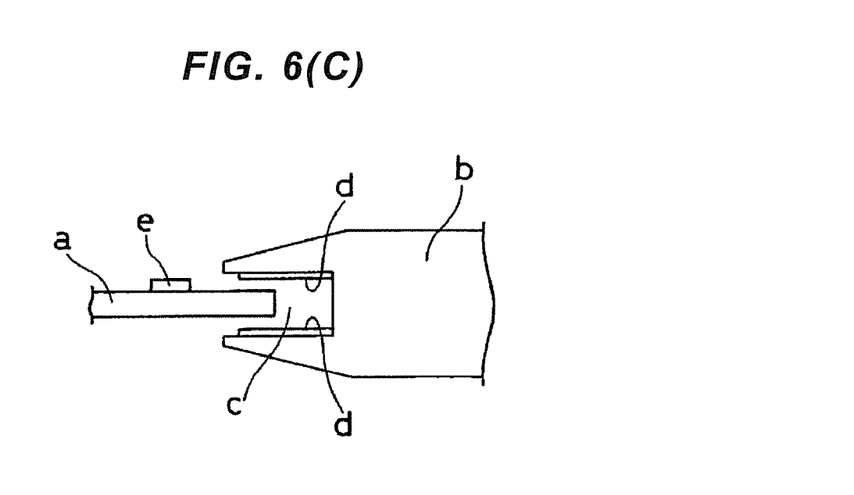

However, in the case that the HDD is exposed to the shock during the time of reading and writing by a head (at a loading time), there arises a phenomenon that the head lifts up on the basis of the contact between the disc a and the ramp b, and a reading error is caused so as to make a problem. In other words, as shown in FIGS. 6A to 6B, since the disc a is deflected by the shock so as to come into contact with the ramp b, the head e lifts up greatly on the basis of inertia (an arrow f in the figure). Next, as shown in FIG. 6C, the lifted head e comes down onto the disc a, the head e and the disc a comes into contact with each other, and the reading and writing error is caused.

In this case, with regard to the structure of the ramp, there have been conventionally known the structures described in Japanese Unexamined Patent Publication No. 2007-280517, Japanese Unexamined Patent Publication No. 2002-279744, Japanese Unexamined Patent Publication No. 2006-323939, Japanese Unexamined Patent Publication No. 2005-310333, and Japanese Unexamined Patent Publication No. 2002-367314, however, none of them is provided with a step structure at a bottom surface portion of the concave disc insertion portion for reducing rigidity of the ramp.

SUMMARY OF THE INVENTION

Problem to be Solved by the Invention

The present invention is made by taking the points mentioned above into consideration, and an object of the present invention is to provide a ramp for a magnetic disc apparatus which can achieve a function of cushioning a shock by lowering rigidity of a resin made ramp constructed as a 2-color molded product to thereby prevent a problem such as a reading error or the like from being caused.

Means for Solving the Problem

In order to achieve the object mentioned above, in accordance with a first aspect of the present invention, there is provided a ramp for a magnetic disc apparatus. The ramp is made of a 2-color mold resin including a resin material for forming a ramp main body and a material having higher rigidity than the resin material. One side surface of the ramp is provided with a concave disc insertion portion for rotatably inserting a magnetic disc, and disc facing surfaces on inner surfaces of the disc insertion portion are provided with disc contact portions made of the high rigidity material. A bottom of a concave portion in the inner surfaces includes a first portion made of the resin material and a second portion made of the high rigidity material. A step structure is provided by arranging the second bottom surface portion made of the high rigidity material at a position moved rearward in a depth direction of the concave portion relative to the first bottom surface portion made of the resin material, for reducing rigidity of the ramp.

Further, in accordance with a second aspect of the present invention, the bottom of the concave portion has a first bottom surface portion made of the resin material, a step surface, a second bottom surface portion arranged at a position moved rearward relative to the first bottom surface portion and made of a resin material, and a third bottom surface portion connected to the second bottom surface portion and made of the high rigidity material so as to be located side by side in a longitudinal direction of the concave portion.

In the resin ramp provided with the concave disc insertion portion for rotatably inserting the magnetic disc, it is possible to reduce the rigidity of the ramp by setting the depth of the disc insertion portion large. In the case that the disc contact portions made of the high rigidity material are provided in the disc facing surfaces in the inner surfaces of the disc insertion portion, the bottom surface portion of the concave portion in the inner surfaces of the disc insertion portion is accordingly constructed by the combination of the bottom surface portion made of the resin material and the bottom surface portion made of the high rigidity material. Therefore, if both of the bottom surface portion made of the resin material and the bottom surface portion made of the high rigidity material are arranged at a position moved rearward in the depth direction of the concave portion for increasing the depth of the disc insertion portion, a collapse (a deformation) in a disc direction is caused at a front end opening portion (a so-called bow pen portion) of the disc insertion portion in which a dimensional precision is most necessary, and there is fear that a dimensional stability is deteriorated.

Consequently, in accordance with the present invention, the structure is made such as to arrange only the latter bottom surface portion made of the high rigidity material among the bottom surface portion made of the resin material and the bottom surface portion made of the high rigidity material at a position moved rearward in the depth direction of the concave portion, thereby lowering the rigidity of the ramp while suppressing the collapse mentioned above. If a part of the bottom surface portion of the concave portion is arranged at a position moved rearward, a step structure is formed between this part and the remaining part.

The step surface of the step structure is set at the boundary portion between the bottom surface portion made of the resin material and the bottom surface portion made of the high rigidity material, however, there is a case that the step surface is set within the region of the bottom surface portion made of the resin material due to some convenience of the 2-color molding including an arrangement, a size and the like of the disc contact portion provided within the disc insertion portion. The present invention includes such the case. The second aspect describes this structure for confirmation.

Effect of the Invention

The present invention achieves the following effects.

As described above, in the ramp for the magnetic disc apparatus of the present invention, since the bottom of the concave portion is constructed by a combination of a first portion made of the resin material and a second portion made of the high rigidity material, and the step structure is provided, it is possible to lower the rigidity of the ramp while inhibiting a collapse at the front end opening portion (the so-called bow pen portion) of the disc insertion portion. Since shock can be cushioned if the rigidity of the ramp is lowered, it is possible to inhibit a problem such as a reading error or the like.

BRIEF EXPLANATION OF DRAWINGS

FIGS. 1A and 1B are perspective views of a ramp in accordance with an embodiment of the present invention, in which

DETAILED DESCRIPTION OF PREFERRED EMBODIMENT

The present invention includes the following modes.

(1) In the case that the disc insertion portion near the sliding portion is moved rearward with the aim of reduction of the rigidity for increasing a shock resistance, the collapse in the disc direction is caused at the so-called bow pen portion (the front end portion) in which a dimensional precision is most necessary, and a dimensional stability is deteriorated.

(2) Accordingly, while maintaining the depth of the disc insertion portion near the sliding portion a depth of the disc insertion portion in the other position is moved rearward.

(3) Alternatively, a volume of the resin having the high rigidity is reduced and a volume of the resin having the sliding characteristic remains unchanged by moving rearward the disc insertion portion with regard to only the portion made of the resin having the high rigidity. As a result, the step is formed at the bottom surface of the disc insertion portion. It is possible to lower the rigidity of the disc insertion portion by reducing the volume of the resin having the high rigidity.

Embodiment

Next, a description will be given of an embodiment in accordance with the present invention with reference to the accompanying drawings.

Figure 1A:
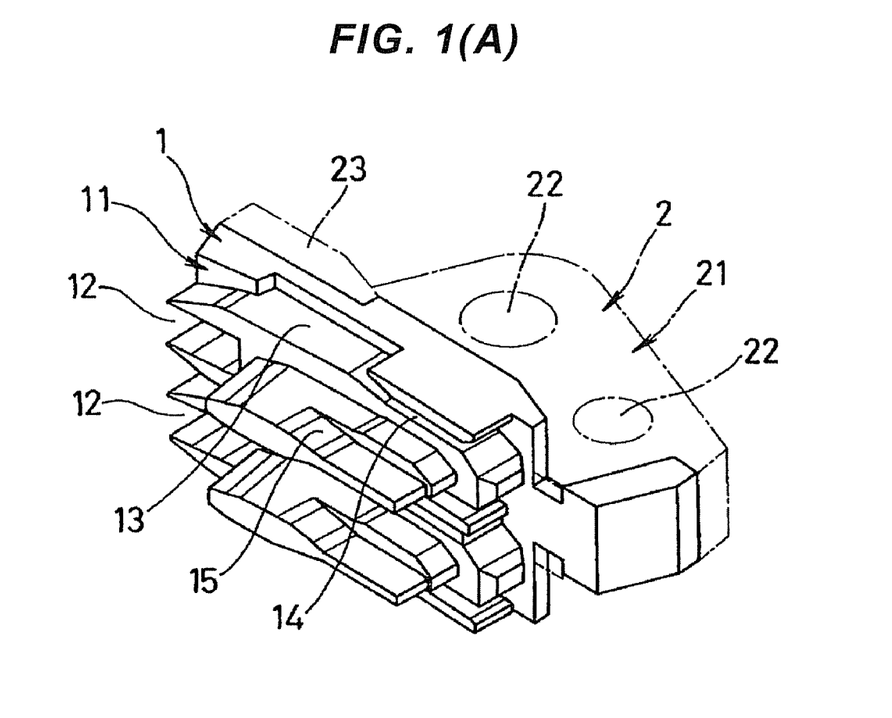
FIG. 1A is a perspective view of a ramp main body.
Figure 1B:
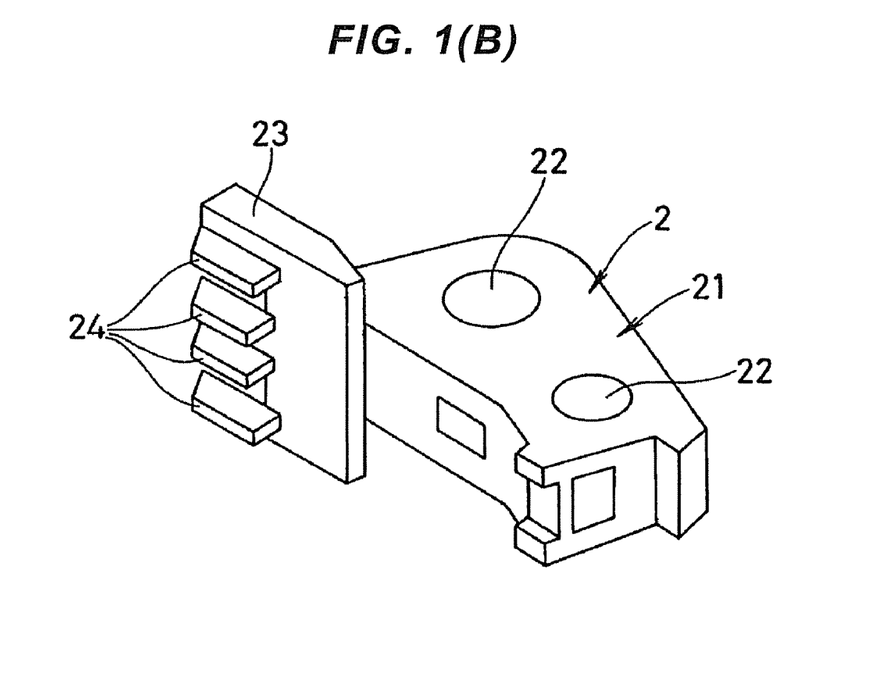
FIG. 1B is a perspective view of an attaching portion.

As shown in FIGS. 1A and 1B, a ramp in accordance with the embodiment is formed as a 2-color molded product made of a resin material 1 such as a polyacetal (POM) or a liquid crystal polymer (LCP) which is excellent in a sliding characteristic, and a resin material 2 such as a polyether imide (PEI) or a polyimide (PI) which has higher rigidity than the resin material 1. A ramp main body (also called as a function portion) 11 shown by a solid line in FIG. 1A is formed by the former resin material 1 which is excellent in the sliding characteristic, and an attaching portion 21 shown by a chain line in FIG. 1A and also shown in FIG. 1B is formed by the latter resin material 2 which has the higher rigidity.

One side surface of the ramp is provided with a plurality of (two in the figure) concave disc insertion portions 12 for rotatably inserting a peripheral edge portion of a magnetic disc (not shown) in a non-contact manner, and the ramp main body 11 is provided with a lift tab sliding surface 13 for slidably guiding a lift tab (not shown) at a front end of a head and making it on standby, a lift tab constraint portion 14 operating as a limiter with respect to the lift tab, and a flexure constraint portion 15 operating as a limiter with respect to a flexure (not shown) so as to be positioned on its front face.

The attaching portion 21 is provided with a desired number of (two in the figure) hole portions 22 such as screw holes or through holes used for installing the ramp so as to be positioned on its plane, and a desired number (four pieces in the figure) of horizontal surface shaped disc contact portions 24 are provided on a front surface of a vertical surface shaped support portion 23. The disc contact portions 24 are arranged on disc facing surfaces (side surfaces of a concave portion, an upper surface and a lower surface in the figure) in an inner surfaces of the disc insertion portion 12, and a disc comes into contact with the disc contact portions 24 in place of the inner surfaces of the disc insertion portion 12.

In order to reduce the rigidity of the resin ramp constructed by the 2-color molded product having the basic structure mentioned above, there can be considered two ways including (i) means by providing of notch portions 17 at a root portion of a ramp center portion 16C, and (ii) means by providing of step structure 18 at a bottom surface portion of the concave disc insertion portion 12, and a description will be given below of each of them.

Figure 2A:
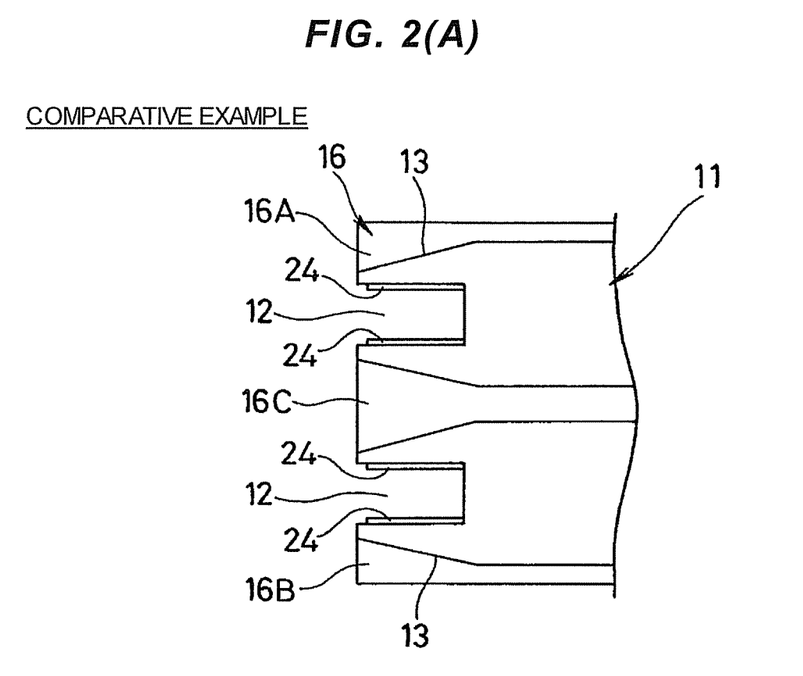
FIG. 2A is a front view of a substantial part of a ramp in accordance with a comparative example.

(i) Means by Providing of Notch Portions 17 at Root Portion of Center Portion 16C First of all, FIG. 2A shows a front face of a substantial part of a ramp in accordance with a comparative example, in which one side surface of the ramp is provided with a plurality of (two in the figure) concave disc insertion portions 12 so as to line up vertically as mentioned above, and a disc contact portion 24 made of a high rigidity resin is arranged in each of the disc insertion portions 12. Further, since the concave disc insertion portions 12 are provided as mentioned above, one side surface of the ramp main body 11 is provided with a plurality of (three in the figure) convex positions 16 formed in a convex shape relatively (protruding to a left side in the figure), and the convex position 16 is constructed by a highest portion (a highest portion convex position) 16A provided with the disc insertion portion 12 only at its lower side, a lowest portion (a lowest portion convex position) 16B provided with the disc insertion portion 12 only at its upper side, and a comparatively thick center portion (a center portion convex position) 16C provided with the disc insertion portion 12 at each of its upper and lower sides, in accordance with a provision of a plurality of concave disc insertion portions 12.

In comparison with the structure in accordance with the comparative example mentioned above, in the embodiment, as shown in FIG. 2B, the notch portions 17 are provided both upper and lower faces at a root portion of the center portion 16C for lowering the rigidity of the ramp, particularly the rigidity of the center portion 16C among the portions 16A, 16B and 16C. On the basis of the provision of the notch portions 17 as mentioned above, a height of the root portion of the center portion 16C is reduced from h1 to h2, and is set to a value which is approximate to heights h3 and h4 of the highest portion 16A and the lowest portion 16B. The notch portion 17 may be provided in any one of both the upper and lower faces at the root portion.

Figure 2B:
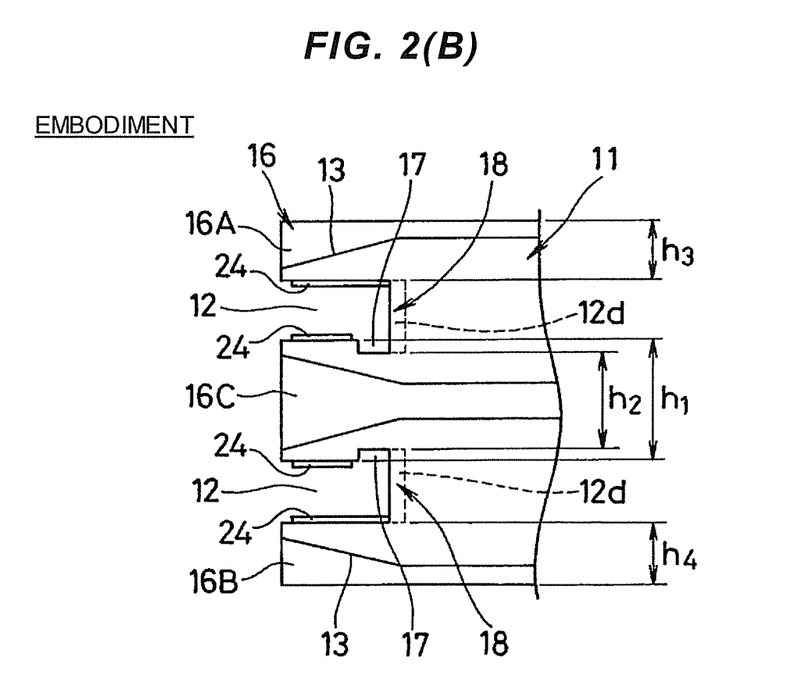
FIG. 2B is a front view of a substantial part of a ramp in accordance with an embodiment of the present invention.

In this case, since the disc contact portions 24 made of the high rigidity resin are arranged on the disc facing surfaces in the inner surfaces of the concave disc insertion portion 12 as mentioned above, the notch portions 17 are provided at a far side of the disc contact portion 24 (a far side of the concave portion in the concave disc insertion portion 12, a right side in FIG. 2). Since a peripheral edge portion of the disc comes into contact with the disc contact portion 24 at a time of inputting of the shock, the notch portions 17 are provided at a position to which the peripheral edge portion of the disc does not come up.

The notch portion 17 is formed as a groove-shaped concave portion, and is formed along a width direction (a direction which is orthogonal to a paper surface in FIG. 2) of the center portion 16C. Further, the notch portion 17 is formed to have a rectangular shape in its cross section as illustrated, however, the cross sectional shape may be formed in a triangular shape, a circular arc shape or the like, and is not particularly limited. Further, the notch portion 17 is provided only in the center portion 16C, and is not provided in the highest portion 16A and the lowest portion 16B.

If the notch portion 17 is not provided, the center portion 16C has a high rigidity due to its volume, and the high rigidity of the center portion 16C causes a problem that the shock tends to be transmitted to the head from the disc and the head lifts up greatly at a time when the disc comes into contact with the center portion 16C due to inputting of the shock to the HDD. On the contrary, in the embodiment, since the notch portions 17 are provided at both the upper and lower faces of the root portion of the center portion 16C in such a manner as to lower the rigidity of the center portion 16C, the rigidity of the center portion 16C is lowered, and the shock is hardly transmitted from the disc to the head at a time when the disc comes into contact with the center portion 16C. Accordingly, it is possible to inhibit the head from lifting up largely at a time of inputting of the shock so as to come down onto the disc, and it is possible to inhibit the reading error due to the drop of the head from being caused. The shock resistance of the resin ramp made of the 2-color molded product, is thus improved.

(ii) Means by Providing of Step Structure in Bottom Surface Portion of Concave Disc Insertion Portion 12

Figure 3A:
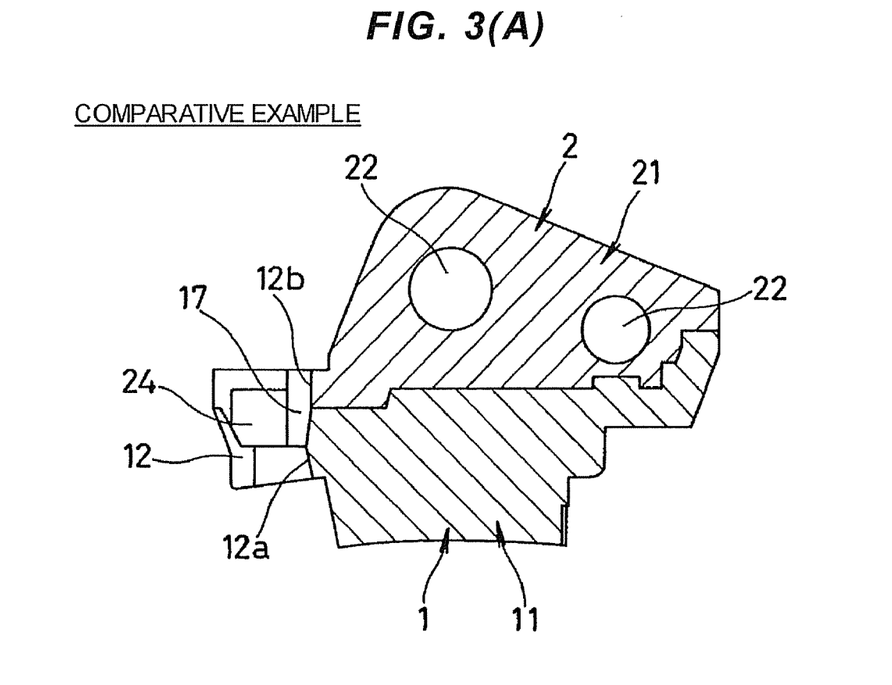
FIG. 3A is a cross sectional view of a ramp in accordance with a comparative example.

Further, FIG. 3A shows a cross section of a ramp in accordance with a comparative example, in which the concave disc insertion portion 12 is provided on one side surface of the ramp as mentioned above, and the disc contact portions 24 made of the high rigidity resin are arranged within the disc insertion portion 12. Further, the bottom surface portion of the concave portion in the inner surfaces of the disc insertion portion 12 is formed by a combination of the bottom surface portion 12a made of the resin material 1 and the bottom surface portion 12b made of the high rigidity material 2, in accordance that the disc contact portions 24 are arranged.

In comparison with the structure in accordance with the comparative example mentioned above, in the embodiment, as shown in FIG. 3B, there is provided the step structure 18 in which the bottom surface portion made of the higher rigidity material 2 is arranged at the rear of the bottom surface portion made of the resin material 1 in the depth direction of the concave portion (the right direction in the drawing) in order to lower the rigidity of the ramp. The bottom surface portion of the concave portion of the disc insertion portion 12 is provided with a first bottom surface portion 12c made of a resin material, a step surface 12d, a second bottom surface portion 12e arranged at a position moved rearward in comparison with the first bottom surface portion 12c and made of a resin material, and a third bottom surface portion 12f connected to the second bottom surface portion 12e and made of a high rigidity material, so as to be placed side by side in a longitudinal direction of the concave portion (a vertical direction in the figure) in this order, on the basis of the provision of the step structure 18 as mentioned above. In each of these portions, the positions of the second and third bottom surface portions 12e and 12f are moved in a depth direction of the concave portion (a right direction in the figure), while the position of the first bottom surface portion 12c remains unchanged, in comparison with the comparative example in FIG. 3A.

Figure 3B:
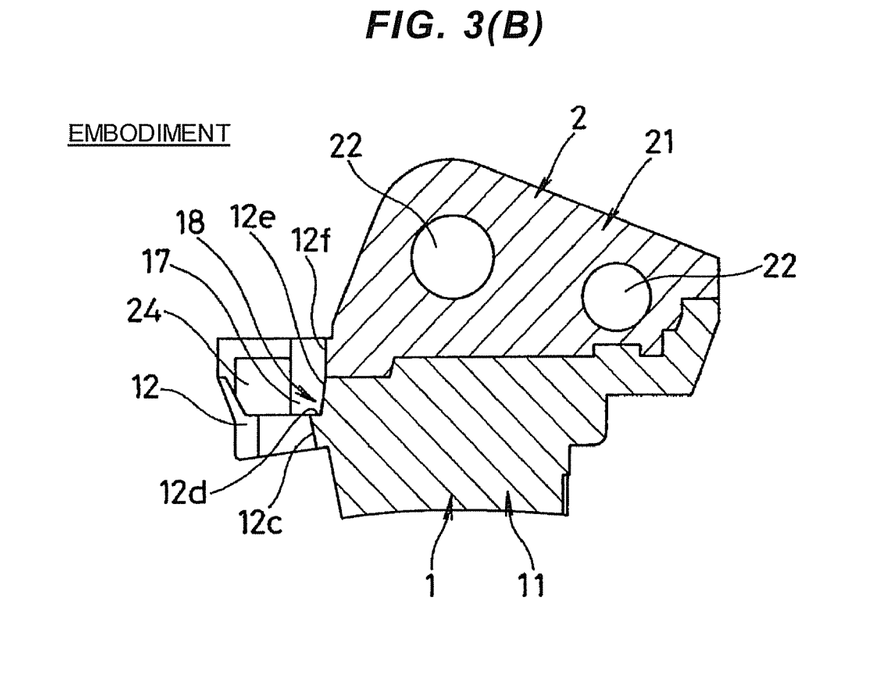
FIG. 3B is a cross sectional view of a ramp in accordance with an embodiment of the present invention.
Figure 4A:
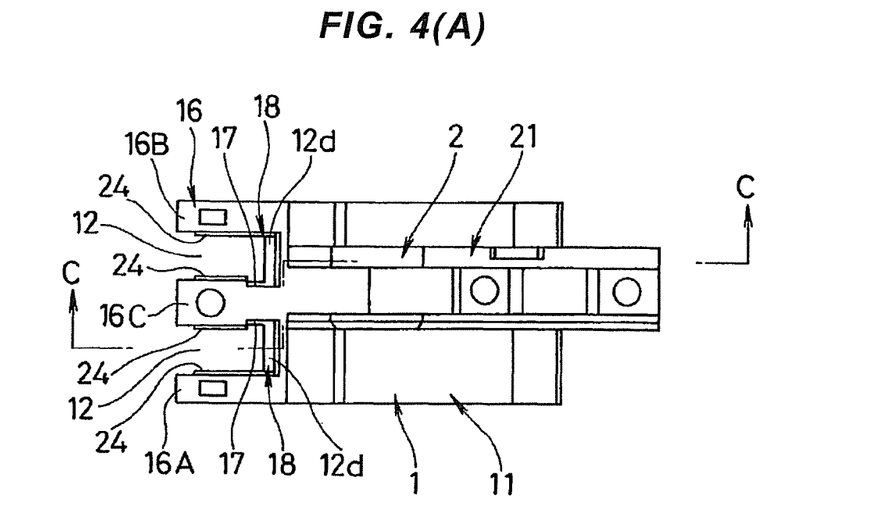
FIG. 4A is a back view of a ramp in accordance with an embodiment of the present invention.
Figure 4B:
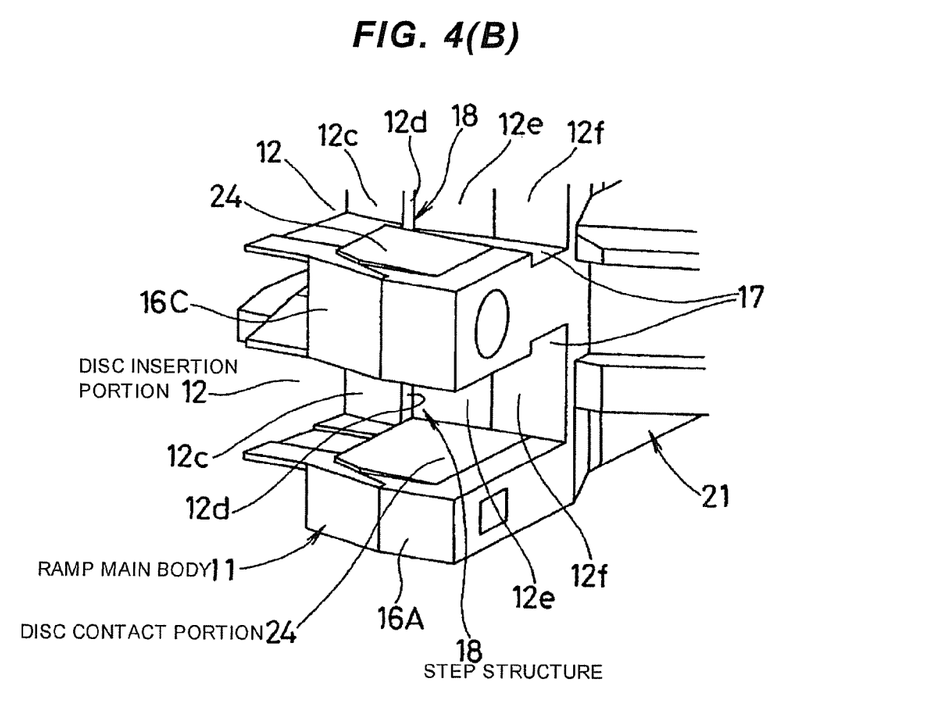
FIG. 4B is a perspective view of a substantial part of the ramp.

FIG. 4A illustrates the ramp in accordance with the embodiment in a different direction, and a cross sectional view in FIG. 3B corresponds to a cross sectional view along a line C-C in FIG. 4A. Further, FIG. 4B is an enlarged perspective view of a substantial part of the ramp.

As mentioned above, in the resin ramp provided with the concave disc insertion portion 12, it is possible to lower the rigidity of the ramp in accordance that the depth of the disc insertion portion 12 is set larger. Accordingly, on the basis of this knowledge the embodiment is structured such that the bottom surface portion of the concave portion of the disc insertion portion 12 is arranged at a position moved rearward in comparison with the conventional one in order to increase the depth of the disc insertion portion 12. However, if the whole of the bottom surface portion of the concave portion is arranged at a position moved rearward, a collapsing deformation in a direction of the disc is caused at a front end opening portion (a so-called bow pen portion) of the disc insertion portion 12 in which the dimensional precision is most necessary, and there is a risk that the dimensional stability is deteriorated. Accordingly, the embodiment is structured such that only the latter bottom surface portion made of the high rigidity material 2 among the bottom surface portion made of the resin material 1 and the bottom surface portion made of the high rigidity material 2 is arranged at a position moved rearward in the depth direction of the concave portion, thereby lowering the rigidity of the ramp while suppressing the collapse mentioned above. Therefore, it is possible to suppress the collapse of the resin ramp and it is possible to improve the shock resistance.

In this case, the embodiment is structured such as to regulate the rigidity of the ramp by providing the notch portions 17 or the step structure 18 in the resin ramp. It is not preferable that the rigidity of the ramp is too high. However, if the rigidity is contrarily too low, an absorption limit of shock energy due to an elastic deformation of the ramp is lowered at a time when the disc comes into contact with the disc contact portion 24, and the shock transmitted to the head becomes large. Accordingly, since the head lifts up largely, it is not preferable. In accordance with the knowledge of the inventors of the present invention, an optimum rigidity value of the disc contact portion 24 exists in a range between 70 and 150 N/mm.

What is claimed is:

1. A ramp for a magnetic disc apparatus, in which the ramp is made of a 2-color mold resin including a resin material for forming a ramp main body and a material having higher rigidity than said resin material, one side surface of said ramp is provided with a concave disc insertion portion for rotatably inserting a magnetic disc, and disc facing surfaces in inner surfaces of said disc insertion portion are provided with disc contact portions made of said high rigidity material, wherein a bottom surfaces portion of a concave portion in the inner surface of said disc insertion portion is constructed by a combination of a bottom surface portion made of said resin material and a bottom surface portion made of said high rigidity material, and a step structure is provided by arranging the bottom surface portion made of said high rigidity material at a position moved rearward in a depth direction of the concave portion in comparison with the bottom surface portion made of said resin material, for reducing rigidity of said ramp.

2. A ramp for a magnetic disc apparatus as claimed in claim 1, wherein the bottom surface portion of the concave portion in the disc insertion portion having the step structure is provided with a first bottom surface portion made of the resin material, a step surface, a second bottom surface portion arranged at a position moved rearward in comparison with said first bottom surface portion and made of the resin material, and a third bottom surface portion connected to said second bottom surface portion and made of the high rigidity material so as to line up in a longitudinal direction of the concave portion.

* * * * *